United States Patent
Shih et al.

(10) Patent No.: US 8,611,475 B2
(45) Date of Patent: Dec. 17, 2013

(54) CHANNEL ESTIMATION AND SYMBOL BOUNDARY DETECTION METHOD

(75) Inventors: Pei-Jun Shih, Tainan (TW); Ching-Sheng Ni, Tainan (TW); Shin-Shiuan Cheng, Tainan (TW)

(73) Assignee: Himax Media Solutions, Inc., Tainan (TW)

( * ) Notice: Subject to any disclaimer, the term of this patent is extended or adjusted under 35 U.S.C. 154(b) by 210 days.

(21) Appl. No.: 13/159,306

(22) Filed: Jun. 13, 2011

(65) Prior Publication Data

US 2012/0230453 A1  Sep. 13, 2012

Related U.S. Application Data

(60) Provisional application No. 61/451,480, filed on Mar. 10, 2011.

(51) Int. Cl.
*H03D 1/00* (2006.01)

(52) U.S. Cl.
USPC ........... 375/343; 375/260; 375/261; 375/226; 370/503; 370/312; 370/350

(58) Field of Classification Search
USPC .................................. 375/260, 343, 348, 226
See application file for complete search history.

(56) References Cited

U.S. PATENT DOCUMENTS

| | | | | |
|---|---|---|---|---|
| 7,391,828 | B2 * | 6/2008 | Liu et al. | 375/342 |
| 8,385,480 | B2 * | 2/2013 | Goto et al. | 375/343 |
| 2003/0099312 | A1 * | 5/2003 | Gummadi et al. | 375/343 |
| 2004/0190560 | A1 * | 9/2004 | Maltsev et al. | 370/503 |
| 2007/0217524 | A1 * | 9/2007 | Wang et al. | 375/260 |
| 2009/0225822 | A1 * | 9/2009 | Tupala et al. | 375/226 |
| 2012/0218933 | A1 * | 8/2012 | Park et al. | 370/312 |

* cited by examiner

*Primary Examiner* — Eva Puente
(74) *Attorney, Agent, or Firm* — Stout, Uxa, Buyan & Mullins, LLP

(57) ABSTRACT

A channel estimation method for use with a received signal by a receiver is disclosed. The received signal comprises multiple data bursts which are transmitted to the receiver via multiple path channels, with each of the data bursts having a plurality of preamble symbols which are decoded. The channel estimation method includes the following steps: firstly, at least one correlation pattern is generated according to the decoded preamble symbols. Then, a cross correlation of the correlation pattern with the received signal is performed to yield at least one correlation result of channel impulse response (CIR). Wherein, the symbol boundary of the received signal is decided according to the correlation result.

17 Claims, 5 Drawing Sheets

1

CHANNEL ESTIMATION AND SYMBOL BOUNDARY DETECTION METHOD

CROSS-REFERENCE TO RELATED APPLICATIONS

This application claims the benefit of U.S. Provisional Application No. 61/451,480, filed on Mar. 10, 2011 and entitled CHANNEL IMPULSE AND SYMBOL BOUNDARY DETECTION OF DVB-T2 SYSTEM, the entire contents of which are hereby incorporated by reference.

BACKGROUND OF THE INVENTION

1. Field of the Invention

The present invention generally relates to a symbol boundary detection method, and more particularly to a channel estimation and symbol boundary detection method in a digital video broadcasting-terrestrial 2 (DVB-T2) system.

2. Description of Related Art

An orthogonal frequency division multiplexing (OFDM) system comprises a high-efficiency multi-path modulation/demodulation technology which utilizes a multi-carrier to transmit OFDM signals, so as to improve data transmission rate. Recently, OFDM technology has been used in various wireless communication systems such as the digital video broadcasting-terrestrial 2 (DVB-T2) system.

A DVB-T2 signal is constructed by super frames, which consist of several T2-frames, to be transmitted in the DVB-T2 system. With reference to FIG. 1, a structure diagram of a T2-frame is shown in which the T2-frame 1 is composed of OFDM symbols, including one first preamble symbol (P1 symbol) 11, several second preamble symbols (P2 symbol) 13 and data symbols 15. To receive DVB-T2 signals, P1 symbol 11 should first be detected and decoded for key parameters such as the transmission type, the P2 symbols 13 then can be successive decoded to obtain the content of the data symbols 15.

The DVB-T2 signals are encapsulated into several packets as the T2-frame 1 structure which are transmitted to the receiver via plural path channels. The channel impulse response (CIR) is usually under perfect channel, to avoid the problem of inter-symbol interference (ISI), a serial of a cyclic prefix (CP) information, as guard interval (GI), is additionally added between symbol packets generally. Furthermore, in order to avoid inter-symbol interference effectively, especially in the multi-path scheme, the symbol boundary should be positioned so that the least-possible ISI is incurred when receiving DVB-T2 signals.

FIG. 2 shows a conventional symbol boundary detection scheme. As illustrated in FIG. 2, the packets 23 as the T2-frame 1 structure are transmitted via plural path channels ($Pa_1,Pa_2$), and the cyclic prefix information is added prior to each of the packets 23. Under the channel, a typical symbol boundary detection scheme will position the OFDM symbol window 25 according to the first propagation path ($Pa_1$), as shown by the dash-line frame in FIG. 2. Once the packet error is occurred when decoding the received signals by the present positioned OFDM symbol window 25, it needs to shift the position of the OFDM symbol window 25 and then detect whether the packet error is occurred. Repeat the above steps until the least-ISI-achieving OFDM symbol window 25 is detected. However, one P1 symbol 11 and several P2 symbols 13 must be decoded in order as long as the position of the OFDM symbol window 25 is adjusted. Therefore, it consumes a lot of search time.

In view of the foregoing, a need has arisen to propose a novel channel estimation and symbol boundary detection method to estimate a channel profile efficiently to further detect an optimal symbol boundary position.

SUMMARY OF THE INVENTION

In view of the foregoing, it is an object of the embodiment of the present invention to provide a symbol boundary detection method for the digital video broadcasting-terrestrial 2 (DVB-T2) system to estimate a channel profile efficiently and detect an optimal symbol boundary position according to the estimated channel profile.

According to one embodiment, a symbol boundary detection method for detecting the symbol boundary of a received signal is disclosed. The received signal comprises a plurality of data bursts which are transmitted via a plurality of path channels, wherein each of the data bursts comprises a plurality of preamble symbols which are decoded. The symbol boundary detection method includes the following steps: firstly, at least one correlation pattern is generated according to the decoded preamble symbols. Then, a cross correlation of the correlation pattern with the received signal is performed to yield at least one correlation result of channel impulse response (CIR). Finally, a symbol window position is adjusted according to the correlation result and the total inter-symbol interference (ISI) power contributed by the path channels is calculated under different symbol window positions. An optimal symbol window is positioned as the symbol window corresponding to the achieved minimum ISI.

According to another embodiment, a channel estimation method for use with a received signal by a receiver is disclosed. The received signal comprises a plurality of data bursts which are transmitted to the receiver via a plurality of path channels, wherein each of the data bursts comprises a plurality of preamble symbols which are decoded. The channel estimation method includes the following steps: firstly, at least one correlation pattern is generated according to the decoded preamble symbols. Then, a cross correlation of the correlation pattern with the received signal is performed to yield at least one correlation result of channel impulse response (CIR). Wherein, the symbol boundary of the received signal is decided according to the correlation result.

DETAILED DESCRIPTION OF THE INVENTION

Figure 1:
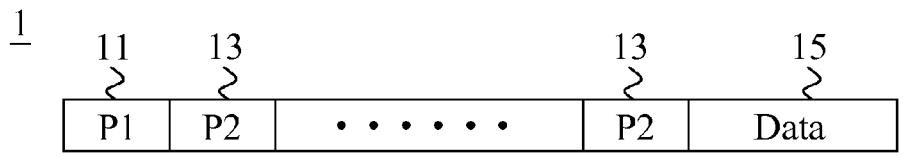
FIG. 1 shows a conventional structure diagram of a T2-frame.
Figure 2:
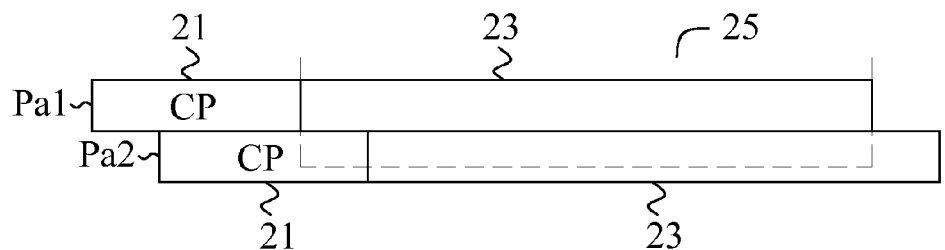
FIG. 2 shows a conventional symbol boundary detection scheme.
Figure 3:
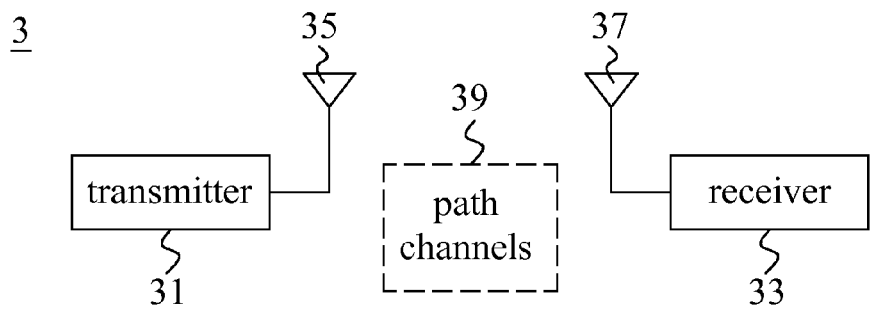
FIG. 3 shows a block diagram illustrating the typical wireless communication system according to one embodiment of the present invention.

Turning to the drawings, FIG. 3 is a block diagram illustrating the typical wireless communication system according to one embodiment of the present invention. As shown in FIG. 3, the wireless communication system 3 comprises a transmitter 31 and a receiver 33, wherein the transmitter 31 and the receiver 33 has antennas 35, 37 respectively. The transmitter 31 emits signals via the antennas 35, and the receiver 33 receives signals via the antennas 37. The received signals are processed such as demodulating and decoding to be useful information. The signals are transmitted to the receiver 33 via a plurality of path channels 39. Specifically, the wireless communication system 3 comprises the digital video broadcasting-terrestrial 2 (DVB-T2) system, which utilizes the T2-frames to transmit digital broadcasting signals such as the signals of various TV channels.

Figure 4:
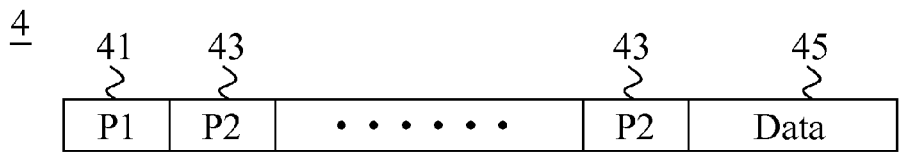
FIG. 4 shows a structure diagram of a T2-frame according to one embodiment of the present invention.

Under multi-path scheme, the receiver 33 receives a received signal, i.e., the digital broadcasting signal. The received signal comprises a plurality of data bursts which are transmitted via a plurality of path channels 39 respectively. The data bursts are encapsulated into several packets as the T2-frame 1 structure and are transmitted to the receiver 33. FIG. 4 shows a structure diagram of a T2-frame 4 according to one embodiment of the present invention. The T2-frame 4 is composed of OFDM symbols, including one first preamble symbol (P1 symbol) 41, several second preamble symbols (P2 symbol) 43 and data symbols 45, as shown in FIG. 4. P1 symbol 41 carries information to indicate key transmission parameters such as the fast Fourier transform (FFT) size and transmission type. P2 symbols 43 carry remaining parameters such as the guard interval (GI), code rate, etc. To receive DVB-T2 signals, P1 symbol 41 should first be detected and decoded for key parameters. Once P1 symbol 41 has been identified, the symbol boundary detection could follow.

Figure 5:
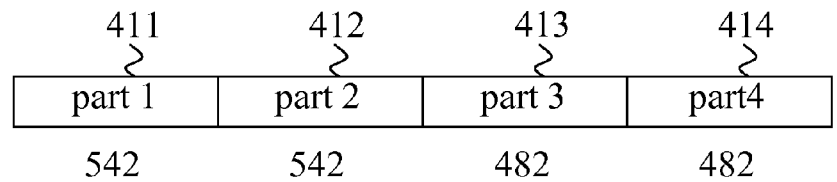
FIG. 5 shows a structure diagram of a first preamble symbol (P1 symbol) according to one embodiment of the present invention.

After the received P1 symbol 41 is detected and decoded, the receiver 33 regenerates the P1 symbol 41 according to the decoded parameters. As shown in FIG. 5, the regenerated P1 symbol 41 is composed of 2048-symbol which is divided into four parts (part1-part4) 411-414. Based on the structure of P1 symbol 41, at least one tailor-made correlation pattern is devised to take advantage of the special formatting of P1 symbol 41.

Figure 6:
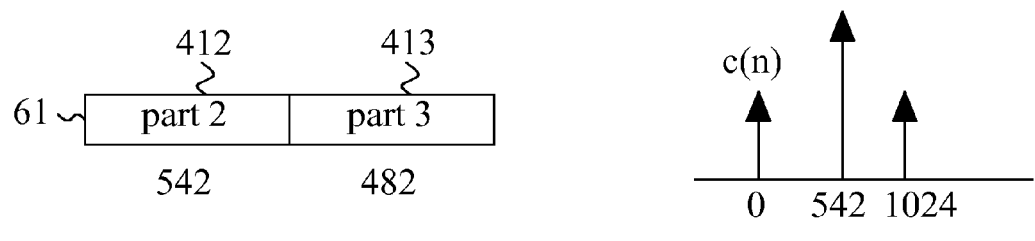
FIG. 6 shows a diagram illustrating the correlation patterns devised by P1 symbol and the corresponding correlation results according to one embodiment of the present invention.
Figure 6:
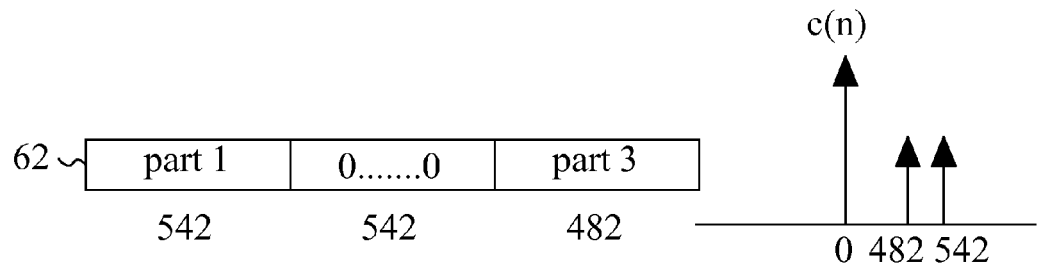
Figure 6:
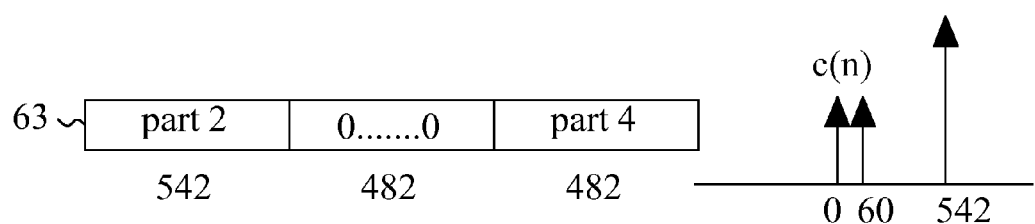

The diagram of FIG. 6 illustrates the correlation patterns devised by P1 symbol 41 and the corresponding correlation results according to one embodiment of the present invention. As shown in FIG. 6, the first correlation pattern 61 is constructed by the part2 412 and the part3 413 of P1 symbol 41, the second correlation pattern 62 is constructed by the part1 411, 542 0-pedding-bit and the part3 413 of P1 symbol 41, and the third correlation pattern 63 is constructed by the part2 412, 482 0-pedding-bit and the part4 414 of P1 symbol 41. Under perfect channel, the cross-correlation of the correlation patterns 61-63 with the received signal yields the correlation results of channel impulse response (CIR) shown next to the correlation patterns 61-63 in FIG. 6.

Taking the first correlation pattern 61 for example, the correlation result has three major pulses. However, under perfect channel, there should only be one propagation path, hence one pulse. Therefore, two extra undesired pulses with smaller power, due to the artifact of the cross-correlation, should be eliminated for correct CIR estimation.

In order to facilitate better working of cancellation, two correlation patterns, the second correlation pattern 62 and the third correlation pattern 63, for cross-correlation are proposed. Taking the second correlation pattern 62 and its corresponding correlation result for example, the main path is at 0 and the undesired artifact paths (at 482 and 542) are positioned in the right of the main path. A Left-to-Right (LtoR) cancellation is employed to eliminate the two undesired artifact paths at 482 and 542. The implementation of the LtoR cancellation is mathematically described in formula (1).

$$t=0\sim N$$
$$s(t+482)=s(t+482)-s(t)\times \alpha_1$$
$$s(t+542)=s(t+542)-s(t)\times \alpha_2 \quad (1)$$

Where s(t) is the received signal, t is the received sample index, and N is the range for successive cancellation. $\alpha_1$ is the gain of pulse(482) relative to gain of pulse(0), that is, $\alpha_1=c(482)/c(0)$; $\alpha_2$ is the gain of pulse(542) relative to gain of pulse(0), that is, $\alpha_2=c(542)/c(0)$.

Similar, taking the third correlation pattern 63 and its corresponding correlation result for example, the main path is at 542 and the undesired artifact paths (at 0 and 60) are positioned in the left of the main path. A Right-to-Left (RtoL) cancellation is employed to eliminate the two undesired artifact paths at 0 and 60. The implementation of the RtoL cancellation is mathematically described in formula (2).

$$t=N\sim 0$$
$$s(t-482)=s(t-482)-s(t)\times \alpha_3$$
$$s(t-542)=s(t-542)-s(t)\times \alpha_4. \quad (2)$$

Where s(t) is the received signal, t is the received sample index, and N is the range for successive cancellation. $\alpha_3$ is the gain of pulse(60) relative to gain of pulse(542), that is, $\alpha_3=c(60)/c(542)$; $\alpha_4$ is the gain of pulse(0) relative to gain of pulse(542), that is, $\alpha_4=c(0)/c(542)$.

Figure 7:
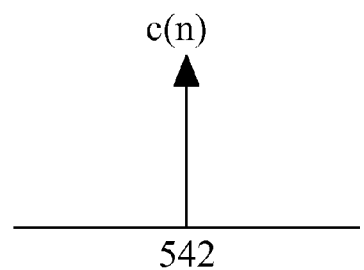
FIG. 7 shows a diagram illustrating the combined result after cancellation according to one embodiment of the present invention.

The successive cancellation could be implemented by either LtoR cancellation or RtoL cancellation, or combined. In the combined scheme, the results of LtoR and RtoL cancellation are added together to increase the power ratio of the main path to noise (SNR), as shown in FIG. 7.

Figure 8:
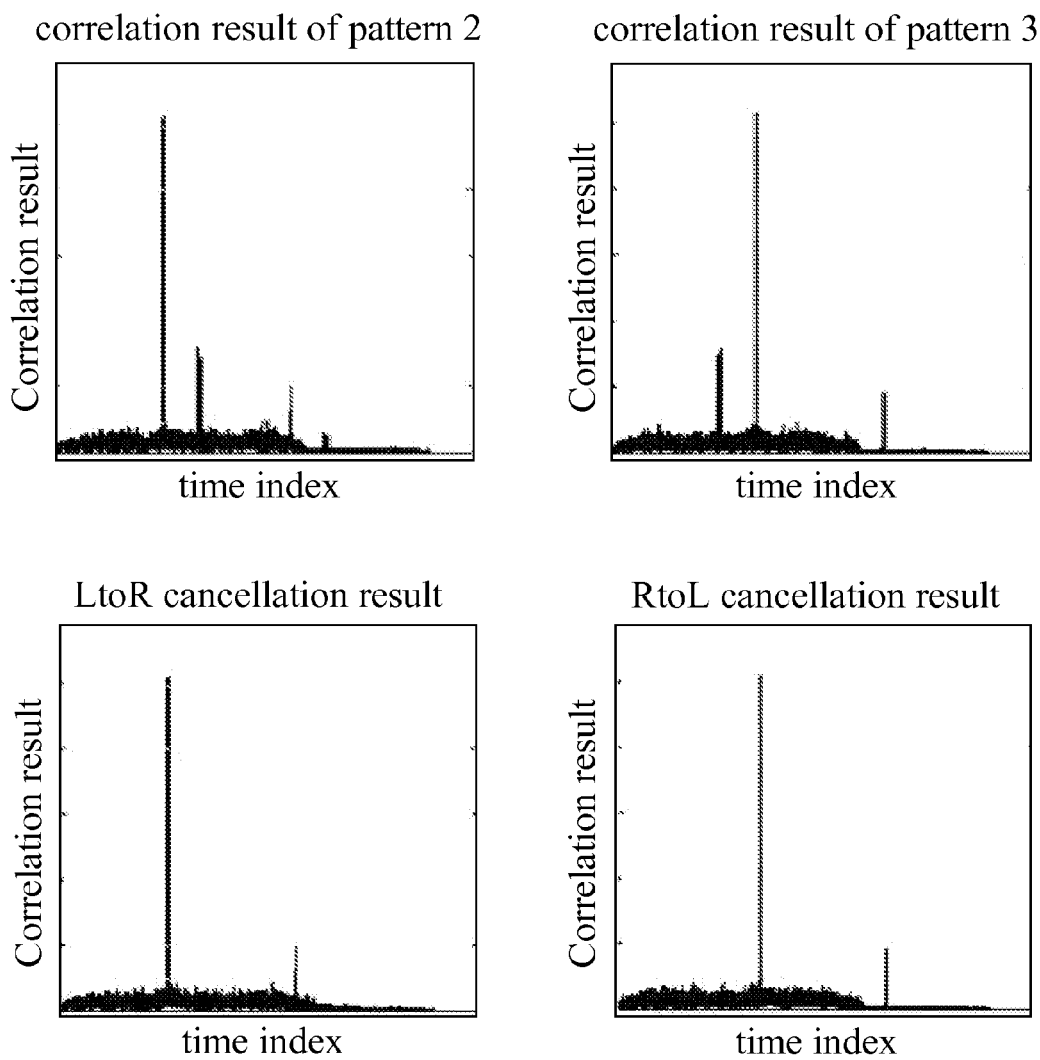
FIG. 8 shows an example of the cross-correlation using pattern 2 and pattern 3, and estimated CIR after LtoR and RtoL successive cancellation respectively according to one embodiment of the present invention.

With reference to FIG. 8, an example of the cross-correlation using pattern 2 (62) and pattern 3 (63), and estimated CIR after LtoR and RtoL successive cancellation respectively is shown according to one embodiment of the present invention. The channel is a single frequency network (SFN) channel with some particular delay profile. As shown in FIG. 8, the undesired artifact pulses with smaller power of the correlation results can be eliminated by the LtoR and RtoL successive cancellations for correct CIR estimation. In one embodiment, in order to simplify the computation, a pulse-threshold is pre-determined. If the power of the remaining pulse is smaller than the pulse-threshold, the path with smaller power could be set to zero.

Under multi-path scheme, the receiver 33 must decide the symbol boundary position of the received signal. To avoid ISI, the symbol boundary should be positioned so that the least-possible ISI is incurred. The incurred ISI can be estimated by the estimated CIR information.

Figure 9:
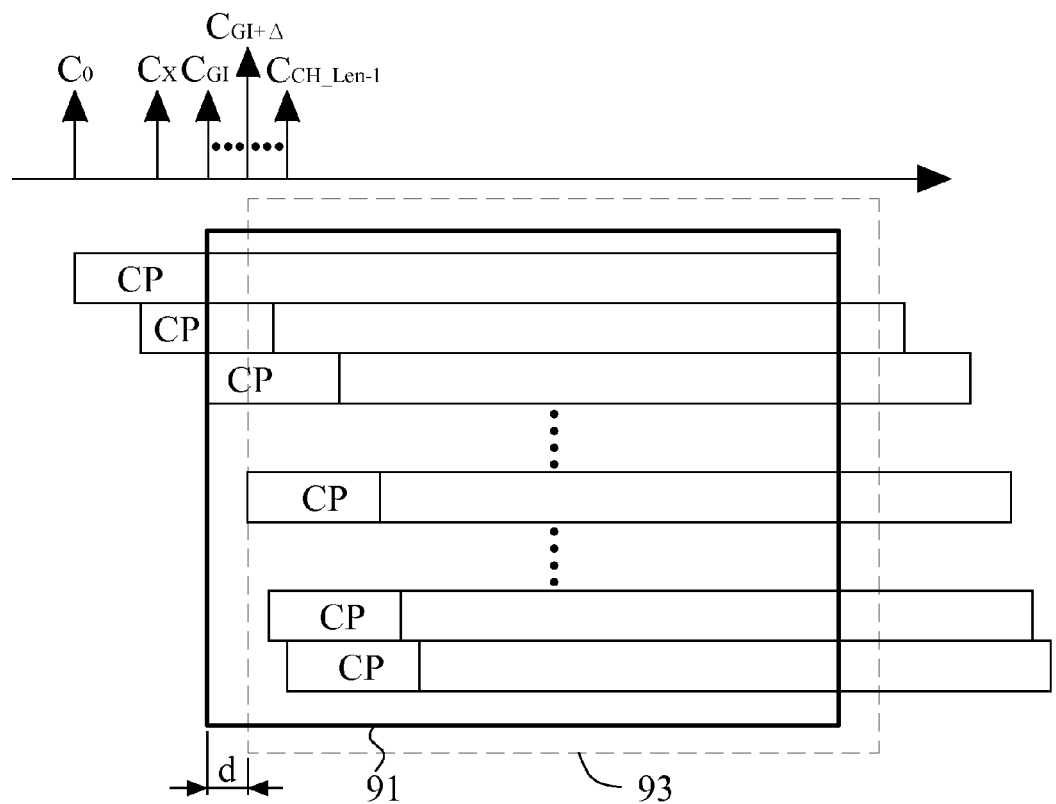
FIG. 9 shows a structure diagram illustrating a more complicated multi-path propagation channel according to one embodiment of the present invention.

Attention is directed next to FIG. 9, which shows a structure diagram illustrating a more complicated multi-path propagation channel according to one embodiment of the present invention, in which the delay spread (the length of the channels) is larger than the guard interval. As shown in FIG. 9, the data bursts of the received signal are encapsulated into several packets as the T2-frame 4 structure which are transmitted to the receiver 33 via multiple path channels. The cyclic prefix (CP) information is added prior to each of the packets 23, as guard interval (GI). Under the symbol window 91 is positioned according to the first propagation path, as shown by the solid-line frame in FIG. 9. However this is not the least-ISI-achieving OFDM symbol window 91 under the estimated channel profile (obtained from the correlation result). For an OFDM signal transmitted through this multi-path channel, the incurred ISI can be roughly estimated by the estimated CIR (obtained from the correlation result). For example, the incurred ISI of the OFDM symbol window 91 could be estimated as formula (3).

$$ISI(0) = c_{CH\_Lsn-1} * s(N-(CH\_Len-GI)) + \quad (3)$$
$$c_{GI+\Delta} * s(N-(CH\_Len-GI-\Delta)) + c_{GI} * s(N-1)$$
$$ISI(1) = c_{CH\_Len-1} * s(N-(CH\_Len-GI-1)) +$$
$$c_{GI+\Delta} * s(N-(CH\_Len-GI-\Delta-1))$$
$$\vdots$$
$$ISI(n) = \dots$$
$$N : FFT\ size$$

In formula (3), ISI(n) is the total ISI contributed to the $(n+GI)^{th}$ symbol point in the symbol window 91. The total incurred ISI at all the points in the symbol window 91 could be calculated. Repeat the above steps each time the symbol window 91 is shifted. Then, the calculated ISI at all the points are summed up by formula (4). For example, $E_{ISI}(0)$ is the total ISI power contributed by path channels $C_{GI}$-$C_{CH\_Len-1}$, incurred at all the points in the symbol window 91. $E_{ISI}(0)$ is estimated by calculating and summing up the ISI incurred at $(GI)^{th}$ sample (=ISI(n)), $(GI+1)^{th}$ sample (=ISI(1)), . . . , and $(CH\_Len-1)^{th}$ sample (=ISI(CH_Len-1)). Wherein, CH_Len is the length of the path channels. According to formula (4), the minimum ISI is achieved when shifting d symbols, corresponding to the dash-line OFDM symbol window 93 as the optimal symbol window position in FIG. 9.

$$E_{ISI}(d) = \sum_{i=0}^{d-1} |c_i|^2 (d-i) + \sum_{i=d}^{L_{CH\_tcn}-GI-1} |c_{GI+i}|^2 (i-d+1) \quad (4)$$

Figure 10:
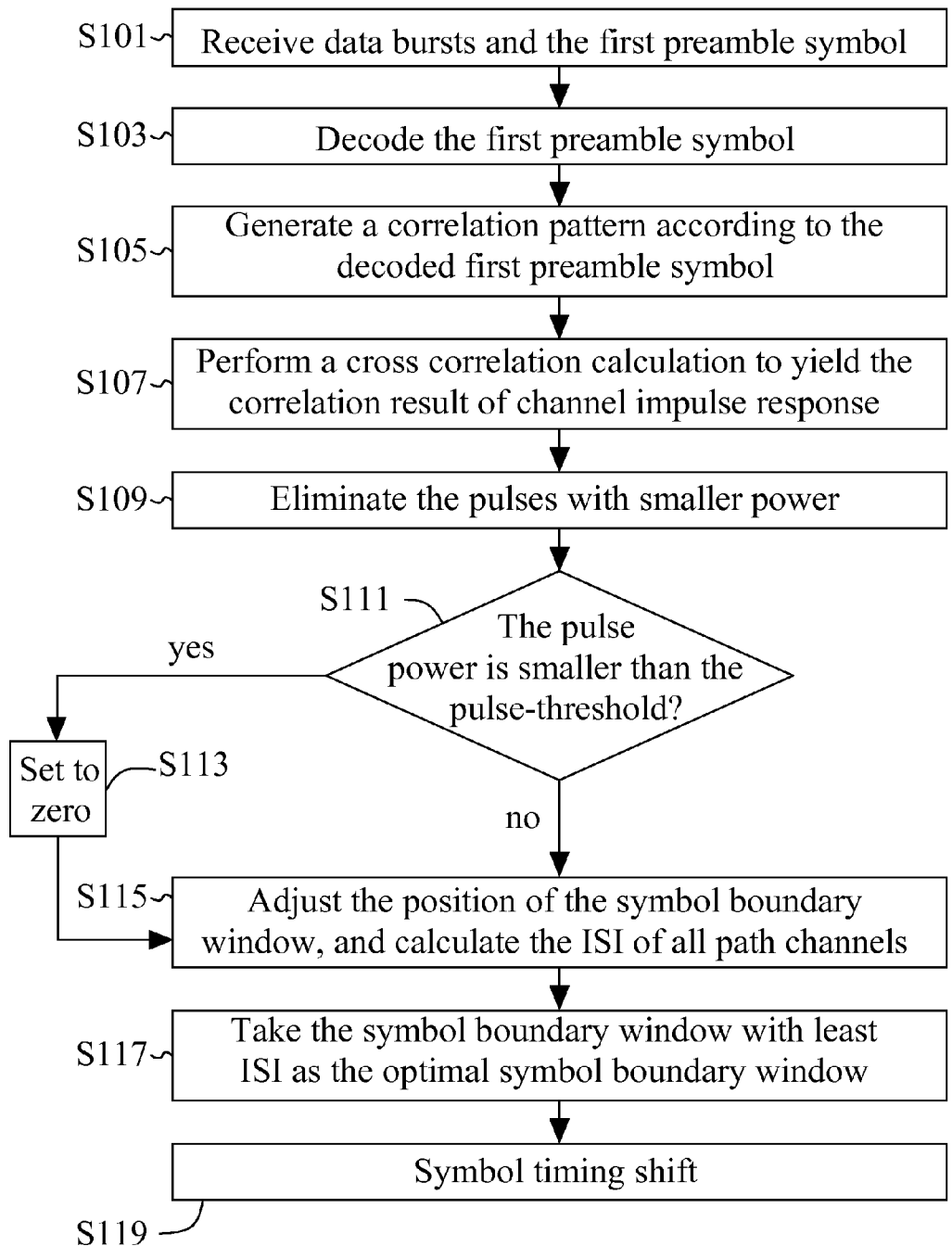
FIG. 10 shows a flow diagram illustrating the symbol boundary detection method according to one embodiment of the present invention.

Finally, reference is made to FIG. 10, which shows a flow diagram illustrating the symbol boundary detection method according to one embodiment of the present invention. The method comprises the following steps.

The receiver 33 receives the data bursts and P1 symbol of a received signal in step S101, and decodes the received P1 symbol in step. S103. Then, a correlation pattern is generated according to the decoded P1 symbol and its special format in step S105. Taking the second correlation pattern 62 for example as below.

Sequentially, a cross-correlation of the generated correlation pattern (second correlation pattern 62 for example) with the received signal yields a correlation result of channel impulse response in step S107. The successive cancellation (LtoR or RtoL cancellation) is employed to eliminate the pulses with smaller power of the correlation result for correct CIR estimation in step S109. Then, it determines that the power of the remaining pulse is smaller than the pre-defined pulse-threshold in step S111. If yes, the path with smaller power could be set to zero to simplify calculation in step S113.

After the CIR information is estimated, the symbol boundary position is adjusted in order to calculate the ISI at all the points of all path channels by formula (3), (4) in step S115. Finally, an optimal symbol window 93 is positioned as the symbol window corresponding to the achieved minimum ISI in step S117. In most cases, the least-ISI OFDM symbol window will have timing offset, a symbol timing shift procedure is performed to avoid the aliasing caused by frequency interpolation in step S119.

As mentioned above, the traditional symbol boundary detection consumes a lot of search time. According to the present invention, the correlation pattern is generated according to the decoded P1 symbol, and the correlation result of CIR can be estimated by cross-correlation. The successive cancellation procedure eliminates the smaller pulses for correct CIR estimation. After the CIR is estimated, the symbol boundary position can be optimized with least-ISI according to the formulas in the present invention. Therefore, the present invention can estimate a channel profile efficiently and detect an optimal symbol boundary position quickly.

Although specific embodiments have been illustrated and described, it will be appreciated by those skilled in the art that various modifications may be made without departing from the scope of the present invention, which is intended to be limited solely by the appended claims.

What is claimed is:

1. A symbol boundary detection method for detecting a symbol boundary of a received signal, wherein the received signal comprises a plurality of data bursts which are transmitted via a plurality of path channels, each of the data bursts comprises a plurality of preamble symbols which are decoded, and the method comprises:
    generating a plurality of correlation patterns according to the decoded preamble symbols, wherein each of the correlation patterns has different parts of the decoded preamble symbols;
    performing a channel estimation procedure, comprising:
        performing a cross correlation of each of the correlation patterns with the received signal to yield a plurality of correlation results of channel impulse response (CIR);
        adjusting a position of a symbol window according to each of the correlation results to calculate a total inter-symbol interference (ISI) power contributed by the path channels, whereby a plurality of total ISI powers is calculated by repeatedly adjusting the position of the symbol window, wherein each of the total ISI powers corresponds to one of the positions, whereby a minimum of the ISI powers is determined; and
        choosing the position corresponding to the minimum of the ISI powers to act as an optimal symbol window to determine the symbol boundary of the received signal.

2. The method of claim 1, wherein the correlation results comprise a plurality of pulses, and the method further comprises:
    eliminating the pulses with smaller power of the correlation results; and
    combining a power of the remaining pulses of each correlation result.

3. The method of claim 2, wherein the pulses comprise a first pulse and a second pulse, the power of the first pulse is stronger than the power of the second pulse, and the step of eliminating the pulses with smaller power comprises:
   calculating a gain ratio of a gain of the second pulse relative to gain of the first pulse; and
   subtracting a value, which is obtained by multiplying the first pulse and the gain ratio, from the second pulse.

4. The method of claim 3, wherein the channel estimation procedure further comprises:
   providing a pre-defined a pulse-threshold; and
   filtering the pulses with smaller power which is smaller than the pulse-threshold.

5. The method of claim 2, wherein each of the data bursts comprises a cyclic prefix (CP), and the step of adjusting the position of the symbol window according to each of the correlation results to respectively calculate the total inter-symbol interference (ISI) power contributed by the path channels further comprises:
   calculating a total incurred ISI at all the points in each of the symbol windows; and
   summing up the total incurred ISI at all the points in the symbol window.

6. The method of claim 5, wherein before the step of generating a plurality of the correlation patterns the method further comprises:
   determining whether the length of the path channels is larger than a guard interval.

7. The method of claim 4, wherein before the step of generating a plurality of the correlation patterns the method further comprises:
   receiving the preamble symbols; and
   decoding the preamble symbols.

8. The method of claim 1, wherein the correlation patterns further comprise a plurality of 0 bits.

9. The method of claim 1, wherein the received signal is composed of OFDM (Orthogonal Frequency Division Multiplexing) symbols.

10. The method of claim 1, wherein the method is used for a digital video broadcasting-terrestrial 2 (DVB-T2) system.

11. A channel estimation method for use with a received signal by a receiver, wherein the received signal comprises a plurality of data bursts which are transmitted to the receiver via a plurality of path channels, each of the data bursts comprises a plurality of preamble symbols which are decoded, and the method comprises:
   generating a plurality of correlation patterns according to the decoded preamble symbols, wherein each of the correlation patterns has different parts of the decoded preamble symbols;
   performing a cross correlation of the correlation patterns with the received signal to yield a plurality of correlation results of channel impulse response (CIR), wherein each of the correlation results comprises a plurality of pulses;
   eliminating the pulses with smaller power of the correlation results;
   combining a power of the remaining pulses of each correlation result; and
   wherein, a position of the symbol boundary of the received signal is decided according to the correlation results.

12. The method of claim 11, wherein the pulses comprise a first pulse and a second pulse, the power of the first pulse is stronger than the power of the second pulse, and the step of eliminating the pulses with smaller power comprises:
   calculating a gain ratio of a gain of the second pulse relative to gain of the first pulse; and
   subtracting a value, which is obtained by multiplying the first pulse and the gain ratio, from the second pulse.

13. The method of claim 12, further comprising:
   providing a pre-defined a pulse-threshold; and
   filtering the pulses with smaller power which is smaller than the pulse-threshold.

14. The method of claim 13, further comprising:
   adjusting a position of a symbol window position according to each of the correlation results to calculate a total inter-symbol interference (ISI) power contributed by the path channels, wherein each of the total ISI powers corresponds to one of the positions, whereby a minimum of the ISI powers is determined; and
   choosing the position corresponding to the minimum of the ISI powers to act as an optimal symbol window.

15. The method of claim 13, further comprising:
   receiving the preamble symbols; and
   decoding the preamble symbols.

16. The method of claim 11, wherein the correlation patterns further comprise a plurality of 0 bits.

17. The method of claim 11, wherein the method is used for a digital video broadcasting-terrestrial 2 (DVB-T2) system.

* * * * *